No. 662,873. Patented Nov. 27, 1900.
C. H. KNIGHT.
CREAM SEPARATOR.
(Application filed Sept. 16, 1899.)
(No Model.)
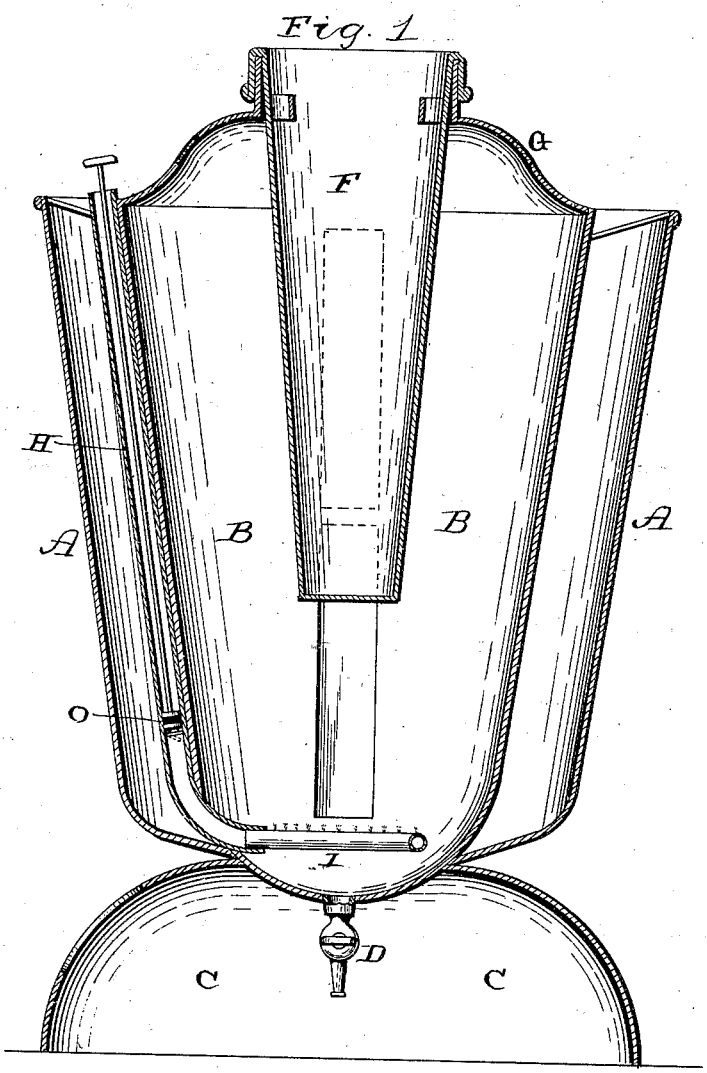
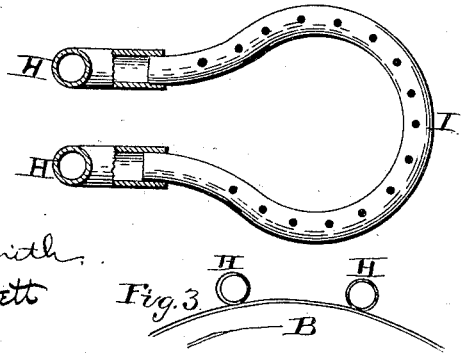
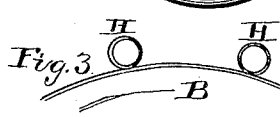
Witnesses
Rosann Smith
Charles P. Swett
Inventor
C. H. Knight,
per O. A. Michel,
Attorney
THE NORRIS PETERS CO., PHOTO-LITHO., WASHINGTON, D. C.

UNITED STATES PATENT OFFICE.

CLAUDE H. KNIGHT, OF PARKER, SOUTH DAKOTA.

CREAM-SEPARATOR.

SPECIFICATION forming part of Letters Patent No. 662,873, dated November 27, 1900.

Application filed September 16, 1899. Serial No. 730,687. (No model.)

*To all whom it may concern:*

Be it known that I, CLAUDE H. KNIGHT, a citizen of the United States, residing at Parker, in the county of Turner and State of South Dakota, have invented certain new and useful Improvements in Cream-Separators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in milk-coolers; and it consists in an inner vessel to receive the milk, a surrounding vessel into which water or other cooling material is to be placed for the purpose of cooling the milk, a faucet through which the milk is to be drawn off, and a sight-pane in the side of the milk-receiving vessel to show the height of the cream, combined with a tube or tubes which extend from above the top of the water-receiving vessel down to or near the bottom of the milk-receiver, a piston or pistons placed in the tubes for forcing air through the tubes, and a perforated tube placed in the bottom of the milk-receiver and through which the air is forced into the milk and water, all of which will be more fully described hereinafter.

The object of my invention is to provide means whereby the cream may be separated from the milk very rapidly and then the mixture of milk and water be drawn off, leaving the cream behind.

In the accompanying drawings, Figure 1 represents a vertical section of an apparatus which embodies my invention. Fig. 2 is a detail view showing the perforated pipe. Fig. 3 is a detail view showing the tubes H secured to the outer side of the milk-receiver.

A represents an outside vessel for receiving water or ice, and B the milk-receiver, which is placed therein and separated therefrom a suitable distance. In the side of the milk-receiver B are placed suitable sight-panes in the usual manner. The water-receiver is provided with a base C, which is sufficiently high to allow free access to the faucet D, through which the milk is drawn off from the milk-receiver. The water or ice placed between the milk-receiver and the vessel A surrounds the milk-receiver upon all sides and the bottom, and serves to extract the heat rapidly from the milk. In order to still further cool the milk after it has been poured into the milk-receiver, a conical water or ice receiver F is placed in the top of the milk-receiver and forms a suitable covering therefor, the heat from the milk being allowed to escape through the strainer-like openings G in the top of the receiver, the cold being applied both to the center of the milk and to the outer side of the receiver. The milk is held between two vertical walls of ice or water, and the natural heat in the milk is quickly expelled.

Extending down the side of the milk-receiver are one or more air-tubes H, which are connected at their lower ends to a curved perforated pipe I, which extends around the bottom of the milk-receiver, and through which curved perforated pipe the air from the tube is forced by means of the piston O, placed in each pipe, and which pistons are provided with suitable rods which extend above the upper ends of the tubes, so as to be freely operated by hand.

After the milk has been placed in the receiver a suitable amount of water is added, and then the pistons are operated a suitable number of times, and the air forces the water into the milk, so as to cause a speedy separation of the particles of cream from the milk. By actual test I have found that the time required for thus separating the milk from the cream is but fourteen minutes. Unless air is forced into the mixture of water and milk the water does not penetrate the milk or mix therewith so intimately as to cause the particles of cream to quickly separate.

The apparatus here shown and described is very simple in construction and operation, is very efficient for separating the cream from the milk, and is very inexpensive to make.

Having thus described my invention, I claim—

In an apparatus for separating cream from milk, an outside receiving vessel for water or ice, a milk-receiver provided with an outlet at its bottom to draw off the milk, and a vertical water-cooler which extends from the top of the receiver down into the center of the milk-receiver, combined with air-pipes, pistons in said air-pipes for forcing the air down into the receiver, and a perforated pipe which is placed in the bottom of the milk-receiver and communicates with the air-pipes, and through which the air is forced into the mixture of the milk and water contained in the milk-receiver, substantially as shown and described.

In testimony whereof I affix my signature in presence of two witnesses.

CLAUDE H. KNIGHT.

Witnesses:
   T. A. LEHMANN,
   JOHN T. BURCH.